(12) United States Patent
Woo

(10) Patent No.: US 6,462,431 B1
(45) Date of Patent: Oct. 8, 2002

(54) REMOTE LOCKING RELEASE DEVICE AND METHOD

(76) Inventor: Leeki Woo, Hansin Bilra., 5-202, Pusan 602-071 (KR)

(*) Notice: Subject to any disclaimer, the term of this patent is extended or adjusted under 35 U.S.C. 154(b) by 0 days.

(21) Appl. No.: 09/744,107
(22) PCT Filed: May 21, 1999
(86) PCT No.: PCT/KR99/00253
§ 371 (c)(1),
(2), (4) Date: Jan. 18, 2001
(87) PCT Pub. No.: WO00/71410
PCT Pub. Date: Nov. 30, 2000
(51) Int. Cl.[7] .................................................. H02G 3/00
(52) U.S. Cl. ........................ 307/9.1; 307/142; 307/139; 307/125; 70/277
(58) Field of Search ................................. 307/109, 142, 307/125, 9.1; 70/297, 279.1; 292/144

(56) References Cited

U.S. PATENT DOCUMENTS 5,271,253 A * 12/1993 Cassada et al. ............... 70/276
5,852,944 A * 12/1998 Collard, Jr. et al. .......... 70/278

FOREIGN PATENT DOCUMENTS

JP 09235927 * 9/1997 .......... E05B/71/00

OTHER PUBLICATIONS

International Search Report PCT/KR99/00253 (Paper 3) May 21, 1999.*

* cited by examiner

Primary Examiner—Brian Sircus
Assistant Examiner—Robert L. Deberadinis
(74) Attorney, Agent, or Firm—Notaro & Michalos P.C.

(57) ABSTRACT

A remote locking release device in a bicycle wheel locking apparatus, including: a remote controller; a light signal receiving unit for generating a locking release signal by a locking release requirement signal received from the remote controller; a position detecting unit for detecting the present position of a locking bar and generating a locking state signal; a controller for generating a relay control signal by the locking release signal and the locking state signal; a relay driving unit for supplying a relay driving voltage by the relay control signal; and a relay for releasing the locking state by the locking bar with falling down a stopper by the delay driving voltage.

9 Claims, 3 Drawing Sheets

REMOTE LOCKING RELEASE DEVICE AND METHOD

BACKGROUND OF THE INVENTION

1. Field of the Invention

The present invention relates to a locking device and in particuarily, a device for releasing the locking state in a remote place and a method therefor.

2. Description of the Related Art

Generally, a locking device has used in two-wheeled vehicle such as a bicycle and a motorcycle in order to prevent the robbery of the above two-wheeled vehicle upon parking and the aforesaid locking device has to be locked and unlocked manually by a driver by hands.

that is, the locking and the unlocking of the lock are performed with most inconvenient posture and processes in that for the sake of locking or unlocking the two-wheeled vehicle, the driver moves to front wheels or back wheels of the above-mentioned vehicle and next, has to be bent his waist or crouched down.

However, there are generated occasions that most of drivers not only evade the locking of the lock but also forget the portage of the lock because the process as noted hereinabove is troublesome. Also, in the event of losing the lock, the locking and the unlocking of the lock is resultedly impossible. Accordingly the robbery accident of the two-wheeled vehicle occurs frequently.

In the meanwhile, the prior art to solve the above problems is disclosed in Korea Laid-Open Utility Models Nos. 97-013538 (Title Handle Locking Device of a Bicycle) and 98-64412 (Title A Bicycle Attached with A Locking Preventing Device).

It is obvious that the above Utility Models as already filed are useful in that the locking device is attached to the two-wheeled vehicle so as to remove the inconvenience of the locking and the unlocking of the lock as the problem of the prior arts.

However, the above Utility Models as described above have complex construction as well as generate the difficulty that a driver can not search his vehicle in the night (in a dark place). Further, in case of rain, there is generated the inconvenience that he reaches to the parking place of the bicycle and next, releases the locking device. Furthermore, it has a problem in that time for realsing the locking device is delayed.

SUMMARY OF THE INVENTION

It is therefore an object of the present invention to provide a device for being off a locking device with remote control and a method therefor.

It is another object of the present invention to provide a device for releasing the locking state in a remote place in order to prevent the robbery upon parking of a two-wheeled vehicle.

It is further object of the present invention to provide a device for releasing the locking state in a remote place in order to prevent the robbery and the loss of the locking device.

These and other objects can be achieved according to the present invention with a remote locking release device in a bicycle wheel locking apparatus, including: a remote controller; a light signal receiving unit for generating a locking release signal by a locking release requirement signal received from the remote controller; a position detecting unit for detecting the present position of a locking bar and generating a locking state signal; a controller for generating a relay control signal by the locking release signal and the locking state signal; a relay driving unit for supplying a relay driving voltage by the relay control signal; and a relay for releasing the locking state by the locking bar with falling down a stopper by the delay driving voltage.

More preferably, the remote locking release device further includes an alarm tone generating unit for generating the alarm tone by the control of the controller and a lamp for lighting.

BRIEF DESCRIPTION OF THE DRAWINGS

A more complete appreciation of this invention, many of the attendant advantages thereof, will be readily apparent as the same becomes better understood by reference to the following detailed description when considered in conjunction with the accompanying drawings, in which like reference symbols indicate the same or similar elements components, wherein.

DETAILED DESCRIPTION OF THE PREFERRED EMBODIMENTS

Hereinafter, a preferred embodiment of the present invention will be in detail explained with reference to the accompanying drawings.

Most of all, a locking release device according to the present invention is mainly used in a two-wheeled vehicle for example a bicycle and a motorcycle, preferably, as a locking device of the bicycle. It will be apparent, however, to one skilled in the art that the above locking release device is applied not only to the bicycle but also to all of two-wheeled bicycles where the locking device is required.

Figure 1:
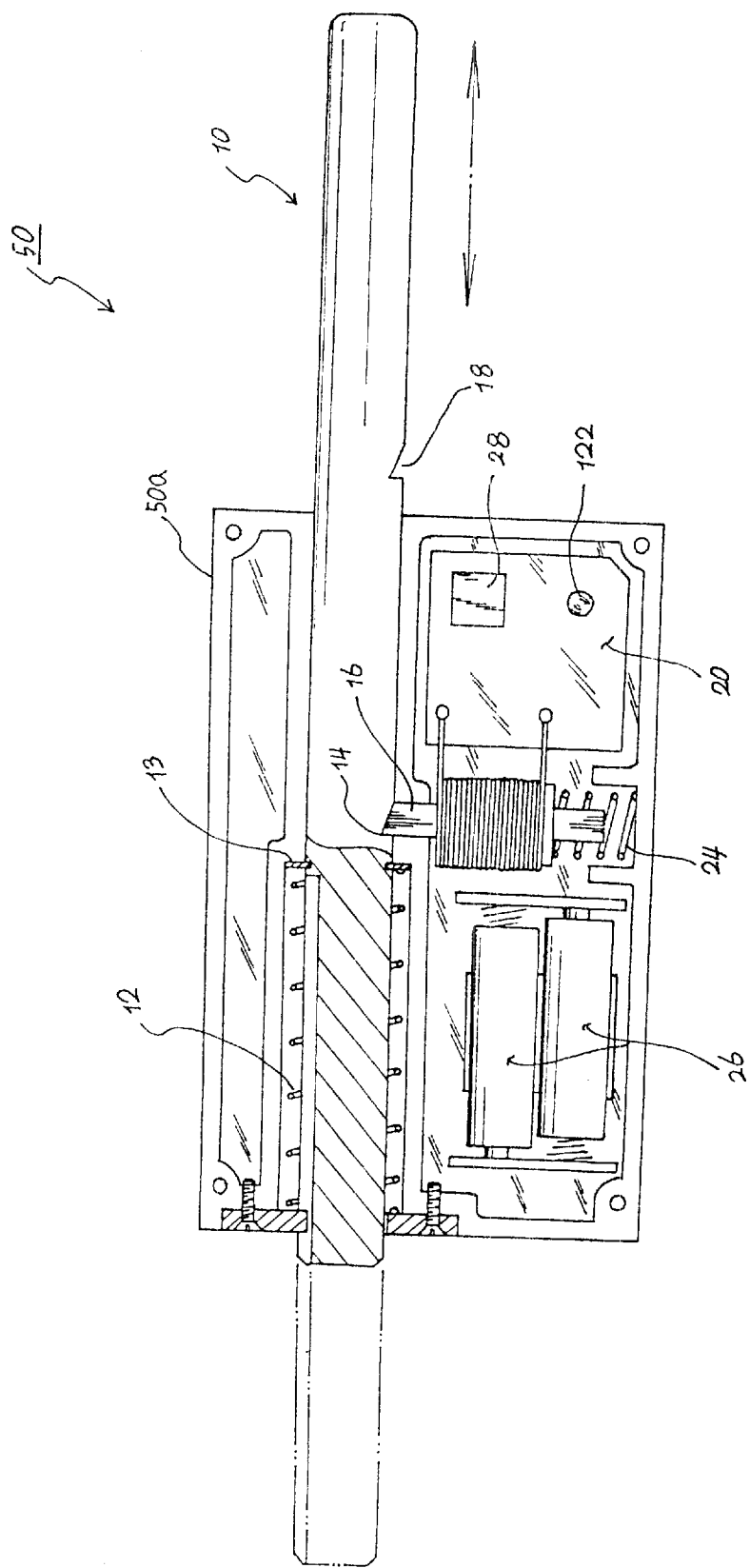
FIG. 1 is a sectional view illustrating the mechanical construction of a remote locking release device according to an embodiment of the present invention.

FIG. 1 is a sectional view illustrating the mechanical construction of a remote locking release device according to an embodiment: of the present invention.

The mechanical construction of the remote locking release device according to an embodiment of the present invention is depicted in FIG. 1.

In explaining the construction of the remote locking release device according to an embodiment of the present invention with reference to FIG. 1, a locking release device 50 includes a locking bar 10 of penetrating a case 50a and the locking bar 10 operates frontwardly and backwardly by the elasticity of a spring 12. That is, the spring 12 is coupled to one side of the locking bar 10 and both surface ends of the spring 12 are fixed by the case 50a and a hooking protrusion 50a Two grooves 14 and 18 are formed in bottom surface of the locking bar 10 while side by side maintaining at regular intervals.

A stopper 16 wound with the coil is installed down the locking bar 10, preferably, in low surface of the grooves 14 and 18 and a spring 24 having the given tension is coupled to the stopper 16. That is to say, the stopper 16 operates upwardly and downwardly by the elasticity of the spring 24 and is inserted into the grooves 14 and 18, simultaneously. The stopper 16 as noted above, preferably, the coil of the stopper 16 is connected with a circuit substrate 20 as a main construction element and has a melody chip 28 for generating the alarm tone and a LED (light-emitting diode).

Herein, a battery 26 for supplying the power supply to the circuit substrate 20 is installed in the interior of the case 50a, preferably, in one side of the stopper 24.

Meantime, the circuit substrate 20 has an IC (integrated circuit) for storing therein the natural number corresponding to each of the locking release device 50, preferably, the secrete number for setting the number set voluntarily by a user, and it is obvious to the related to embody the above technique.

Figure 2:
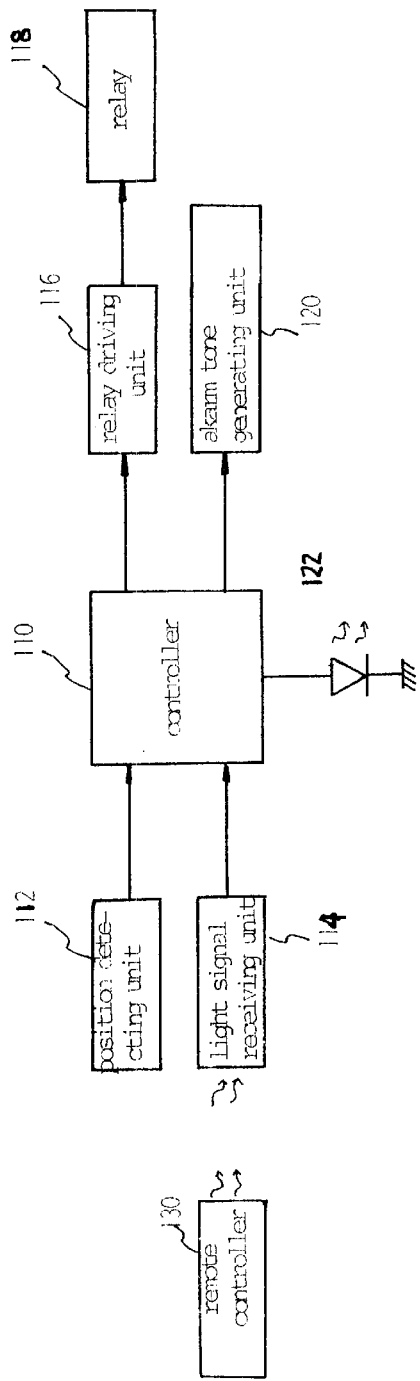
FIG. 2 is a view illustrating the construction of the locking release device where the locking state is able to be released with a remote controller in a remote place according to an embodiment of the present invention.

FIG. 2 is a view illustrating the construction of the locking release device where the locking state is able to be released with a remote controller in a remote place according to an embodiment of the present invention.

With respect to FIG. 2, a remote controller 130 transmits a radio signal of requiring the release of the locking state by the operation of the user. To embody the above operation, an operational key operated by the user and the construction for generating the radio signal by the input of the operational key are required. In the meanwhile, the radio signal includes all signals for radio-transmission in a remote place, and an example of the radio signals corresponds to an infrared rays signal.

A controller 110 performs the control for releasing the locking state by checking the release state in receiving a locking release requirement, and the control for informing the completion of releasing the locking state, simultaneously. While the method for releasing the locking state can be variously embodied, a method using a relay is disclosed in the detailed description as below, as an example. Also, a representative example of the methods for informing the release of the locking stale is a method using a display lamp and a method using the alarm tone. Further, the alcove two methods are disclosed in the detailed description as below.

A position detecting unit 112 provides a locking state dection signal or a locking release detection signal corresponding to a position detected with detecting the position of the locking bar 10 to the controller 110. The position detecting unit 112 is capable of being embodied with using an infrared rays sensor.

A light signal receiving unit 113 detects the locking state release requirement with receiving the infrared rays signal transmitted from the remote controller 130 and informs the detection of the locking state to the controller 110.

A relay driving unit 116 drives a relay 118 to release the locking state under the control of the controller 110.

The relay 118 drives the driving voltage supplied from the relay driving unit 116 and falls down the stopper 116. Accordingly, the relay 118 release the locking state with movement of the locking bar 10 by the elasticity of the spring 12.

An alarm tone generating unit 120 can be embodied with using the melody chip 28 and generates the alarm tone for informing the release of the locking state by the control of the controller. The alarm tone as generated above is able to be embodied variously by the melody chip 28 for embodying the alarm tone generating unit 120.

The LED 122 emits to inform the locking release under the control of the controller 110. Also, the LED 122 can be embodied with a given period according to the control format of the controller 110.

Figure 3:
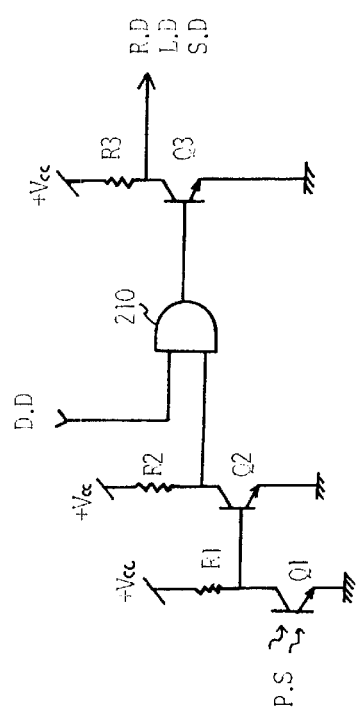
FIG. 3 is a view illustrating an example of the locking release device embodied with hardware logic according to an embodiment of the present invention.

FIG. 3 is a view illustrating an example of the locking release device embodied with hardware logic according to an embodiment of the present invention.

In view of FIG. 3, while the present invention discloses the construction comprised of two resistors R1 and R2 and two transistors Q1 and Q2, as, an example of the construction of generating the locking release requirement signal with receiving the light signal (the infrared rays signal), the connection and operation of two resistors R1 and R2 and two transistors Q1 and Q2 are explained as follows. The transistor Q1 as a light receiving transistor, performs the switch operation by existence/nonexistence of the light signal (the infrared rays signal: P.S.) and determines existence/nonexistence of the bypass of the voltage applied to a collector through the resistor R1. The transistor Q2 uses the collector voltage of the transistor Q1 as the bias voltage, is switched by the bypass voltage, is switched by the bias voltage, and determines the existence/nonexistence of the bypass of the voltage applied to the collector through the resistor R2. Namely, when the infrared rays signal of requiring the locking release from the remote controller 130 is received. the transistor Q1 is turned on and maintains the collector voltage as the logic low level by bypassing the voltage applied through the resistor R1. The logic low level outputs the locking release requirement signal of the logic high level with closing the bypass path of the voltage applied through the resistor R2 because the transistor Q1 is turned off with the supply of the bias voltage of the transistor Q2.

Meantime, a logic gate 210 generates the locking release requirement signal and the locking release signal by a position detection signal P.D. provided from the position detecting unit 112. As an example, the logic gate 210 uses the position detection signal P.D. of the logic high level as the detection signal in the event of embodying the logic gate 210 as an OR gate, and the position detection signal P.D of the logic high level as the detection signal. Therefore, the OR gate generates the locking release signal of the logic high level only when receiving the position detection signal P.D. of the logic high level corresponding to the locking state detection signal and the locking release requirement signal of the logic high level according to receiving of the infrared rays signal from the remote controller 130.

The transistor Q3 uses the locking release signal as the bias voltage, performs the switching operation, and generates a relay driving signal R.D., a LED driving signal L.C, and an alarm tone control signal S.C. by the above switching operation. The relay driving signal RD., the LED driving signal L.C., and the alarm tone control signal S.C. which are generated by the above switching operation of the transistor. Q3, are supplied to the relay driving signal R.D., and the melody chip 28 (hereinafter, referred to as the "alarm tone generating unit" 120), and simultaneously operates the release of the locking state and the alarm tone and an alarm light.

Figure 4:
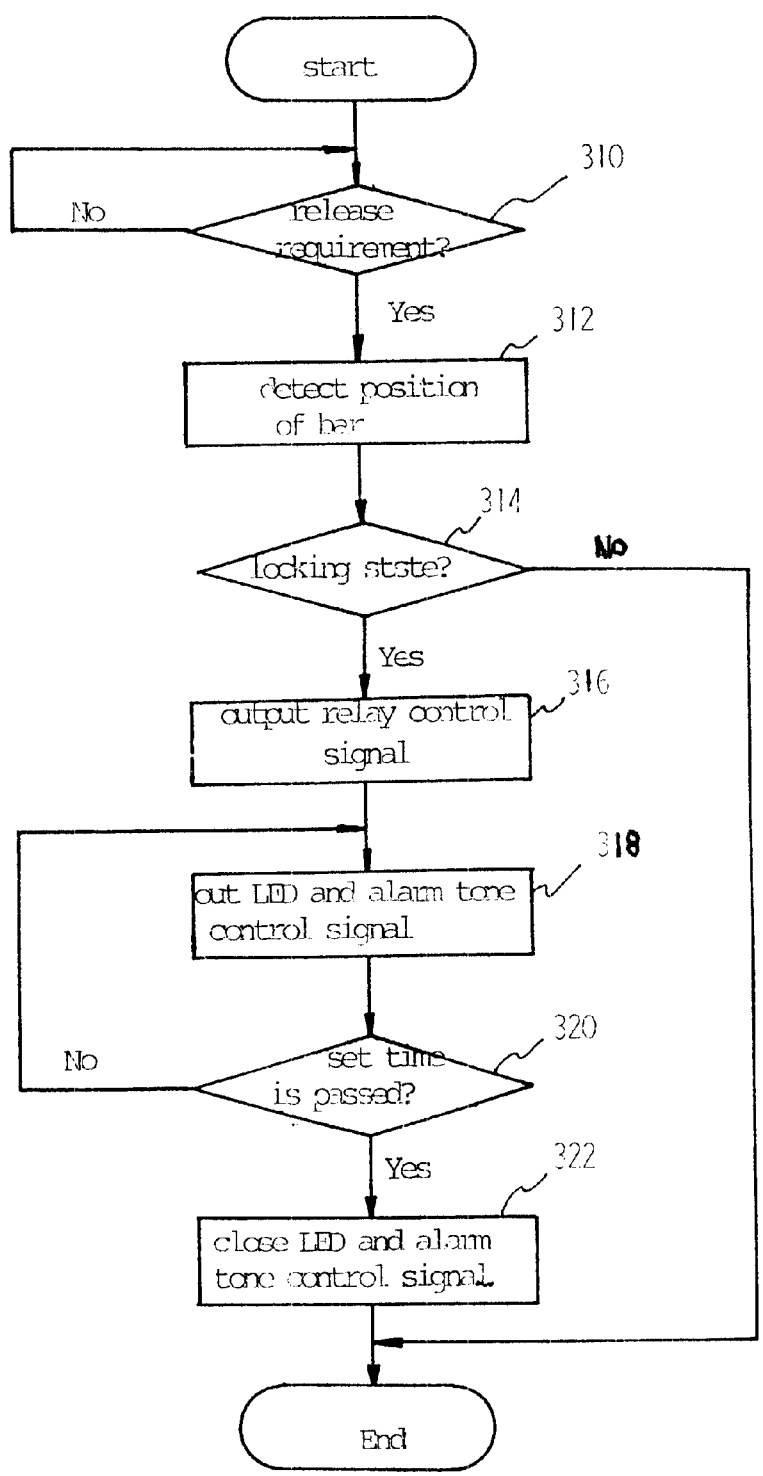
FIG. 4 is a control flow chart illustrating the locking release process according to an embodiment of the present invention.

FIG. 4 is a control flow. chart illustrating the locking release process according to in embodiment of the present invention. With reference to FIGS. 1 to 4, an operation according to an embodiment of the present invention will be in detailed explained as follows.

The controller 110 checked in step 310 whether the release requirement generated from the remote controller 130 is detected by the light signal receiving unit 114. The above detection operation is performed by the locking release signal provided from the light signal receiving unit 114.

In the above step 310, upon checked that the release requirement generated therefrom was detected thereby, the controller processes to step 312 detects the position of the locking bar 10. The detection of the position of the locking bar 10 is performed by the position detecting unit 112. When the detection of the position of the locking bar 10 is completed, the controller 110 processes to step 314, detects existence/unexistence of the locking by a state detection signal provided from the position detecting unit 112.

When the locking state was detected in the step 314, the controller 110 processes to step 316. But, when the locking state was not detected therein, namely, the release state was detected therein, the controller 110 ignores, the release requirement received from the remote controller 130 and completes the release operation.

In the aforesaid step 316, the controller 110 outputs the relay control signal to the relay driving unit 116. The relay driving unit 116 provided with the relay control signal detects the above output of the relay control signal as the locking release requirement and supplies the driving voltage for driving the relay 118 so as to release the locking. Due to this, the relay 118 falls down the stopper 16 and releases the locking state in order that the locking bar 10 can be moved by the elasticity of the spring 12.

In the meantime, the controller 110 outputs the relay control signal in the step 316 and outputs a control signal S.D. for requiring the alarm tone generation and a control signal L.D. for the control of the LED 122. Thus, the LED 122 is lighted. or emitted by the control signal L.D. provided from the controller 110, and the alarm tone generating unit 120 generates the alarm tone by the control signal S.D. provided from the controller 110.

While operating the LED 122 and the alarm tone generating unit 120 in the step 318, the controller 110 lastly checks in step 320 whether the set time is passed. The above checking of the set time is define the operation for informing the locking release to. a specific time. Thus, when checked in the above step 320 that the set time was passed, the controller 110 processes to step 322, closes the control signal L.D. for the control of the LED 122 outputted and the control signal for requirement of the alarm tone generation.

As may be apparent from the foregoing, the present invention can release the locking device in the remote place with using the remote controller, thereby solving the problem in that a key for locking release has to be carried or the secret number has to be memorized. Also, because of releasing the locking state in the remote place, it has an effect in that a user is provided with the convenience.

Moreover, the present invention has an advantage in that the driver can search his two-wheeled vehicle in the dark place or in the remote place with attaching the melody chip and the LED in the interior of the locking device and more particularly in case of rains, the user is provided Pith the convenience because of releasing the locking device with the remote controller in the remote place. Also, upon operation of the locking device, the driver can lock and unlock the two-wheeled vehicle regardless of any posture, simply. In addition, since the lock is unnecessary, the problem of losing the lock is removed.

While there have been illustrated and described what are considered to be preferred embodiments of the present invention, it will be understood by those skilled in the art that various changes and modifications may be made, and equivalents may be substituted for elements thereof without departing from the true scope of the present. invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A remote locking release device in a bicycle wheel locking apparatus, comprising:
   a remote controller;
   a light signal receiving unit for generating a locking release signal by a locking release requirement signal received from said remote controller;
   a position detecting unit for detecting the present position of a locking bar and generating a locking state signal;
   a controller for generating a relay control signal by said locking release signal and said locking state signal;
   a relay driving unit for supplying a relay driving voltage by said relay control signal; and
   a relay for releasing the locking state by said locking bar with falling down a stopper by said delay driving voltage.

2. The device as defined in claim 1, further comprising:
   an alarm lone generating unit for generating an alarm tone by the control of said controller.

3. The device as defined in claim 1 or 2, further comprising:
   a lamp for lighting by the control of said controller.

4. The device as defined in claim 3, wherein said lamp is comprised of a light-emitting diode.

5. The device as defined in claim 4, wherein said locking release requirement signal corresponds to an infrared rays signal.

6. A remote locking release method in a bicycle wheel locking apparatus, comprising:
   a first step of detecting a locking release requirement signal received from a remote controller;
   a second step of, upon said locking release requirement signal was detected in said first step, detecting a present position of said locking bar and existence/nonexistence of the lock; and
   a third step of, upon said locking state was detected in said second step, driving a relay, falling down a stopper, and releasing the locking state by said locking bar.

7. The method as defined in claim 6, further comprising a fourth step of, upon said locking state was detected in said second step, generating an alarm tone.

8. The method as defined in claim 7, further comprising a fifth step of, upon said locking state was detected in said second step, lighting a lamp.

9. The method as defined in claim 8, wherein said locking release requirement signal corresponds to an infrared rays signal.

* * * * *